(12) United States Patent
Shimauchi

(10) Patent No.: US 11,897,310 B2
(45) Date of Patent: Feb. 13, 2024

(54) VEHICLE THERMAL MANAGEMENT SYSTEM

(71) Applicant: TOYOTA JIDOSHA KABUSHIKI KAISHA, Toyota (JP)

(72) Inventor: Takayuki Shimauchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 159 days.

(21) Appl. No.: 17/691,787

(22) Filed: Mar. 10, 2022

(65) Prior Publication Data

US 2022/0314730 A1 Oct. 6, 2022

(30) Foreign Application Priority Data

Apr. 2, 2021 (JP) ................... 2021-063223

(51) Int. Cl.
*B60H 1/00* (2006.01)
*B60L 7/10* (2006.01)
(Continued)

(52) U.S. Cl.
CPC ......... *B60H 1/004* (2013.01); *B60H 1/00428* (2013.01); *B60H 1/2221* (2013.01); *B60L 1/00* (2013.01); *B60L 7/10* (2013.01); *B60L 53/22* (2019.02); *H01M 10/625* (2015.04); *H01M 10/63* (2015.04); *H01M 10/663* (2015.04); *B60H 1/00278* (2013.01);
(Continued)

(58) Field of Classification Search
CPC .. B60H 1/004; B60H 1/00428; B60H 1/2221; B60H 1/00278; B60H 1/00764; B60H 2001/00307; B60L 1/00; B60L 7/10; B60L 53/22; B60L 58/20; B60L 2210/10; B60L 2220/42; H01M 10/625; H01M 10/63; H01M 10/663; H01M 2220/20
See application file for complete search history.

(56) References Cited

U.S. PATENT DOCUMENTS

| 7,755,306 B2 * | 7/2010 | Oyobe | H02M 7/493 318/98 |
| 8,285,422 B2 * | 10/2012 | Nagao | G06F 1/266 700/286 |

(Continued)

FOREIGN PATENT DOCUMENTS

| DE | 102020106700 A1 * | 9/2020 | ......... B60H 1/00278 |
| DE | 102020131848 A1 * | 6/2021 | |

(Continued)

*Primary Examiner* — Ljiljana V. Ciric
(74) *Attorney, Agent, or Firm* — Dinsmore & Shohl LLP

(57) ABSTRACT

A control device supplies regenerative electric power to increase an output of a low-voltage air conditioner when the regenerative electric power is surplus with respect to electric power that is able to be charged to a main battery as compared with a case where the regenerative electric power is not surplus with respect to the electric power that is able to be charged to the main battery. Therefore, it is possible to reduce an output (work load and electric power per unit time) of a high-voltage air conditioner required to maintain comfort of an occupant in a vehicle cabin. Therefore, it is possible to improve electric power consumption rate while maintaining comfort of the occupant in the vehicle cabin.

4 Claims, 3 Drawing Sheets

(51) Int. Cl.
*H01M 10/625* (2014.01)
*B60L 1/00* (2006.01)
*B60H 1/22* (2006.01)
*B60L 53/22* (2019.01)
*H01M 10/663* (2014.01)
*H01M 10/63* (2014.01)
*B60L 58/20* (2019.01)

(52) U.S. Cl.
CPC ............... *B60H 1/00764* (2013.01); *B60H 2001/00307* (2013.01); *B60L 58/20* (2019.02); *B60L 2210/10* (2013.01); *B60L 2220/42* (2013.01); *H01M 2220/20* (2013.01)

(56) References Cited

U.S. PATENT DOCUMENTS

| | | | | |
|---|---|---|---|---|
| 8,509,975 | B2* | 8/2013 | Izumi | B60K 6/28 |
| | | | | 320/161 |
| 8,981,729 | B2* | 3/2015 | Machida | B60L 53/00 |
| | | | | 320/108 |
| 9,281,677 | B2* | 3/2016 | Billod | H02H 3/08 |
| 9,403,439 | B2* | 8/2016 | Nakasako | B60L 58/20 |
| 9,849,793 | B2* | 12/2017 | Tashiro | B60L 58/25 |
| 9,973,018 | B2* | 5/2018 | Suzuki | H02J 7/14 |
| 10,081,268 | B2* | 9/2018 | Obata | H01M 10/48 |
| 10,118,493 | B2* | 11/2018 | Nada | B60L 7/12 |
| 10,164,453 | B2* | 12/2018 | Nepote | H02J 7/1423 |
| 10,295,610 | B2* | 5/2019 | Kagami | B60L 58/10 |
| 10,407,005 | B2* | 9/2019 | Aoki | B60R 16/03 |
| 10,569,728 | B2* | 2/2020 | Martin | B60L 8/003 |
| 10,916,962 | B2* | 2/2021 | Hida | H02J 7/14 |
| 11,031,780 | B2* | 6/2021 | Takemoto | H02J 1/12 |
| 11,095,147 | B2* | 8/2021 | Eriksson | G01R 31/382 |
| 11,400,818 | B2* | 8/2022 | Kobayashi | B60L 1/02 |
| 11,552,471 | B2* | 1/2023 | Takemoto | H02M 3/04 |
| 11,607,959 | B2* | 3/2023 | Sakata | B60L 58/20 |
| 2004/0239181 | A1 | 12/2004 | Obayashi et al. | |
| 2012/0299552 | A1* | 11/2012 | Machida | H02J 7/04 |
| | | | | 320/138 |
| 2014/0216693 | A1* | 8/2014 | Pekarsky | H01M 10/625 |
| | | | | 165/104.31 |
| 2016/0236581 | A1* | 8/2016 | Tashiro | B60L 7/14 |
| 2022/0024277 | A1* | 1/2022 | Shimauchi | B60H 1/00792 |
| 2022/0314730 | A1* | 10/2022 | Shimauchi | H01M 10/663 |

FOREIGN PATENT DOCUMENTS

| | | | | |
|---|---|---|---|---|
| EP | 2246956 B1 * | 3/2016 | | B60K 6/28 |
| JP | H08308016 A * | 11/1996 | | |
| JP | H1014010 A * | 1/1998 | | |
| JP | 2002058111 A * | 2/2002 | | |
| JP | 2004-254465 A | 9/2004 | | |
| WO | WO-2009104305 A1 * | 8/2009 | | B60K 6/28 |

* cited by examiner

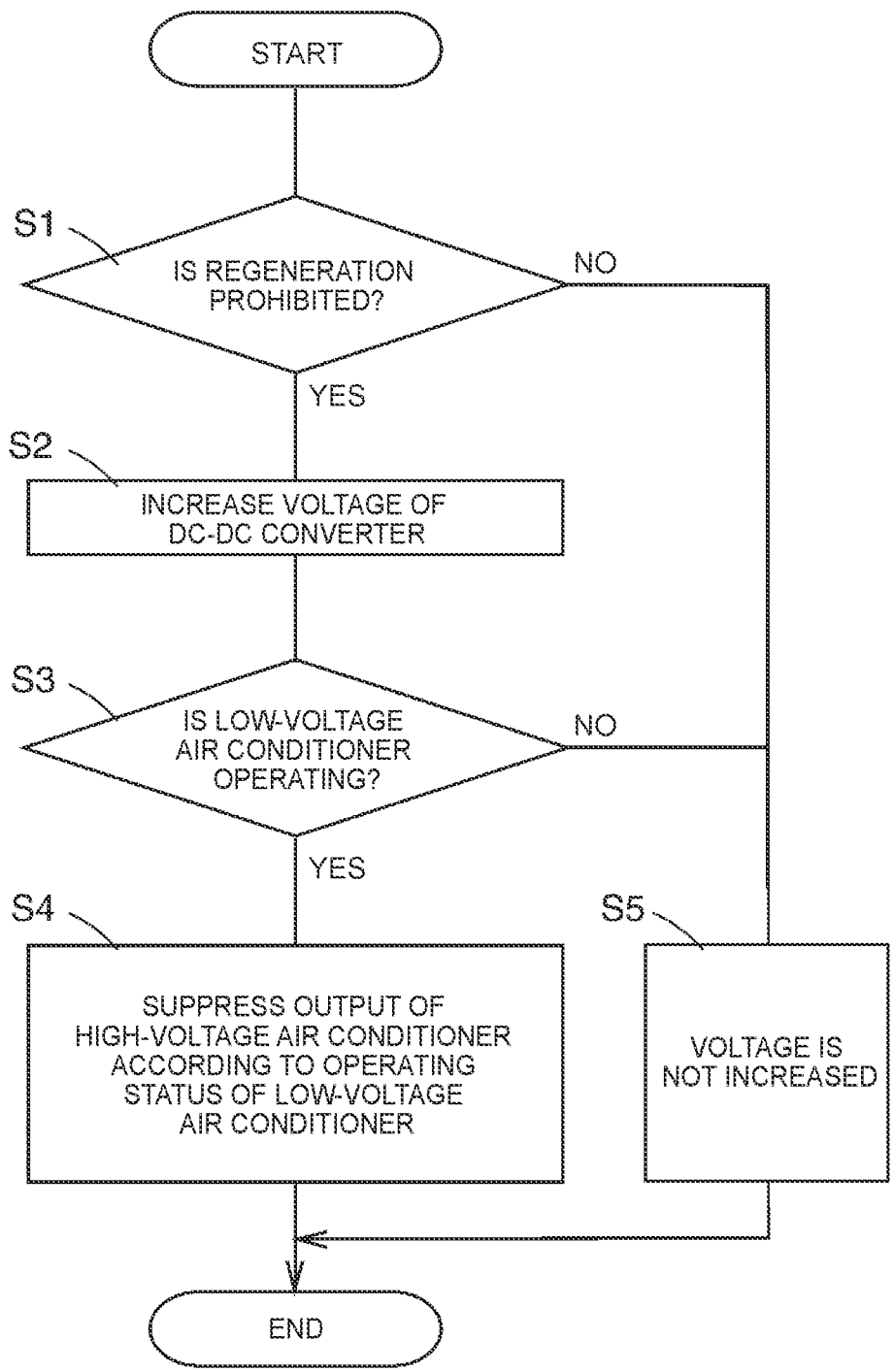

VEHICLE THERMAL MANAGEMENT SYSTEM

CROSS-REFERENCE TO RELATED APPLICATION

This application claims priority to Japanese Patent Application No. 2021-063223 filed on Apr. 2, 2021, incorporated herein by reference in its entirety.

BACKGROUND

1. Technical Field

The present disclosure relates to a vehicle thermal management system in which a main battery and an auxiliary battery are mounted.

2. Description of Related Art

Japanese Unexamined Patent Application Publication No. 2004-254465 (JP 2004-254465 A) discloses a technique for increasing power consumption of a plurality of electric loads and consuming surplus electric power thereof when regenerative electric power is surplus.

There is a need to improve electric power consumption rate as much as possible in the case of electric vehicles (EV) and plug-in hybrid vehicles (PHV). However, the technique disclosed in JP 2004-254465 A does not disclose that work load of a high-voltage air conditioner to which electric power is supplied from a main battery is reduced by using surplus regenerative electric power. Therefore, there is room for improvement in terms of improving the electric power consumption rate.

SUMMARY

An object of the present disclosure is to provide a vehicle thermal management system capable of improving the electric power consumption rate.

The present disclosure that achieves the above object is as follows.

(1) A vehicle thermal management system includes a high-voltage air conditioner to which electric power is supplied from a main battery, a low-voltage air conditioner to which electric power is supplied from an auxiliary battery of which an output voltage is lower than an output voltage of the main battery, and a control device that includes a travel control electronic control unit and an air conditioner electronic control unit that are connected to each other such that the travel control electronic control unit and the air conditioner electronic control unit are able to communicate with each other, and supplies regenerative electric power to increase an output of the low-voltage air conditioner when the regenerative electric power is surplus with respect to electric power that is able to be charged to the main battery as compared with a case where the regenerative electric power is not surplus with respect to the electric power that is able to be charged to the main battery.

(2) In the vehicle thermal management system described in (1), the control device changes an output of the high-voltage air conditioner according to the output of the low-voltage air conditioner.

(3) In the vehicle thermal management system described in (2), the control device reduces the output of the high-voltage air conditioner when the output of the low-voltage air conditioner is increased as compared with a case where the output of the low-voltage air conditioner is not increased.

(4) In the vehicle thermal management system described in any one of (1) to (3), the main battery is able to exchange electric power with a motor generator, a direct-current direct-current converter that lowers a voltage in an electric power path is provided between the auxiliary battery and the electric power path provided between the main battery and the motor generator, and the control device increases the output of the low-voltage air conditioner by increasing a voltage of the direct-current direct-current converter and increasing a voltage of the auxiliary battery when the regenerative electric power is surplus as compared with a case where the regenerative electric power is not surplus with respect to the electric power that is able to be charged to the main battery.

According to the vehicle thermal management system described in (1), the control device supplies the regenerative electric power to increase the output of the low-voltage air conditioner when the regenerative electric power is surplus with respect to the electric power that is able to be charged to the main battery as compared with a case where the regenerative electric power is not surplus with respect to the electric power that is able to be charged to the main battery, so that the output of the high-voltage air conditioner that is required to maintain comfort of an occupant in the vehicle cabin (work load and electric power per unit time) is able to be reduced. Therefore, it is possible to improve electric power consumption rate while maintaining comfort of an occupant in a vehicle cabin.

According to the vehicle thermal management system described in (2) or (3), since the control device changes the output of the high-voltage air conditioner according to the output of the low-voltage air conditioner, the output of the high-voltage air conditioner is able to be reduced when the output of the low-voltage air conditioner is increased as compared with a case where the output of the low-voltage air conditioner is not increased. Therefore, it is possible to improve electric power consumption rate while maintaining comfort of an occupant in a vehicle cabin.

According to the vehicle thermal management system described in (4), since the control device increases the voltage of the direct-current direct-current converter to increase the voltage of the auxiliary battery and to increase the output of the low-voltage air conditioner, the output of the low-voltage air conditioner is able to be comparatively easily increased.

BRIEF DESCRIPTION OF THE DRAWINGS

Features, advantages, and technical and industrial significance of exemplary embodiments will be described below with reference to the accompanying drawings, in which like signs denote like elements, and wherein:

FIG. 2 is a control flowchart of a control device in the vehicle thermal management system according to the embodiment; and FIG. 3 is a diagram showing a relationship between an output of a high-voltage air conditioner and an output of a low-voltage air conditioner in the vehicle thermal management system according to the embodiment.

DETAILED DESCRIPTION OF EMBODIMENTS

Figure 1:
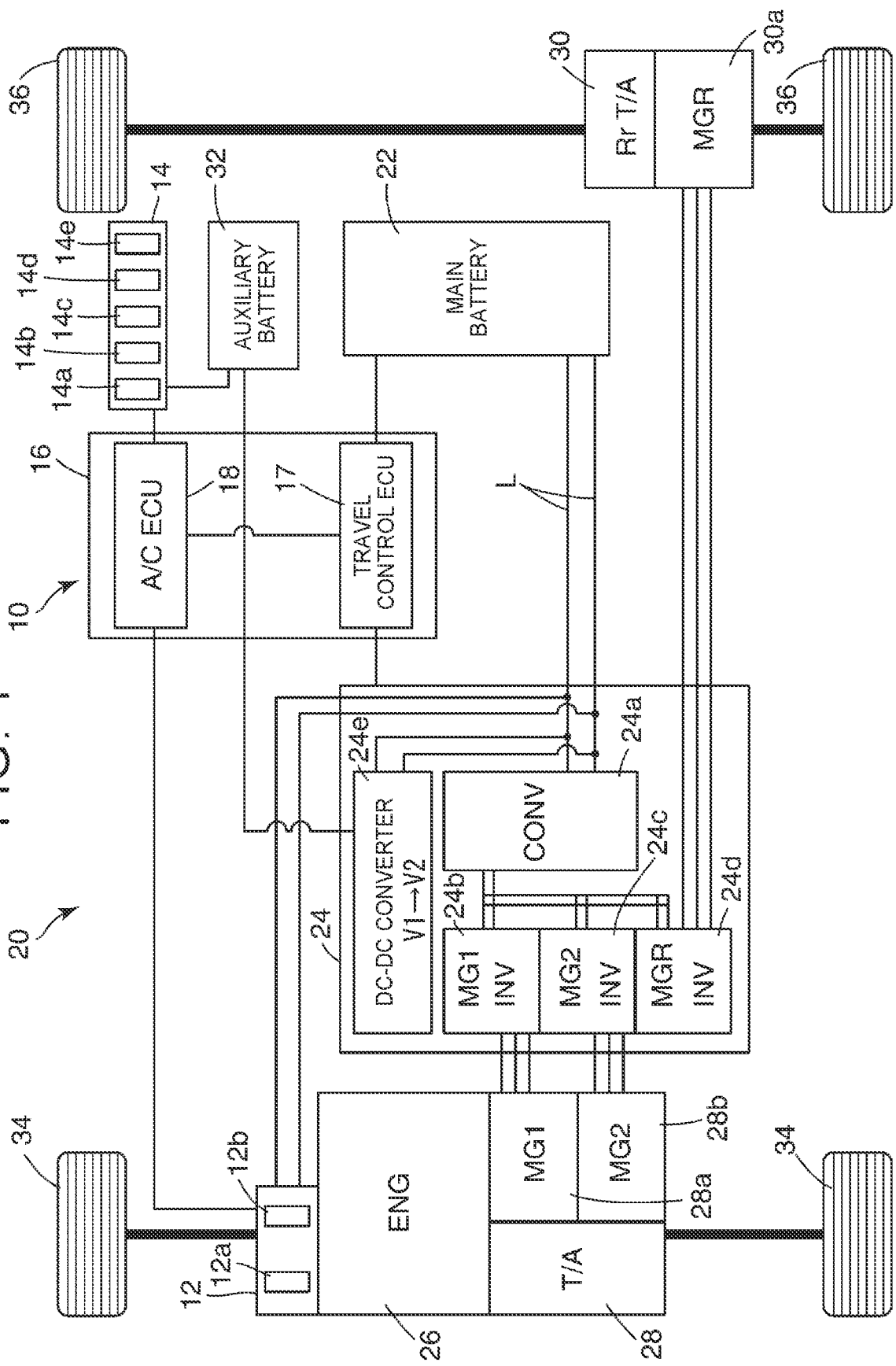
FIG. 1 is a schematic configuration diagram of a vehicle when the vehicle equipped with a vehicle thermal management system according to an embodiment is a plug-in hybrid vehicle (PHV)

Hereinafter, a vehicle thermal management system (which may be referred to as a vehicle air conditioning device) 10 according to an embodiment will be described with reference to the drawings.

FIG. 1 shows an example of a vehicle 20 equipped with the vehicle thermal management system 10 (hereinafter, also simply referred to as a system) according to the embodiment. Note that FIG. 1 shows a case where the vehicle 20 equipped with the system 10 is a plug-in hybrid vehicle (PHV). However, as long as the vehicle 20 includes a main battery 22 and an auxiliary battery 32 to be described later, the vehicle may be an electric vehicle (EV), a hybrid vehicle (HV), or a fuel cell vehicle (FCV).

As shown in FIG. 1, the vehicle 20 includes the main battery 22, a power control unit (PCU) 24, an engine 26, first and second motor generators 28a and 28b housed in a transaxle 28, a rear motor generator 30a housed in a rear transaxle 30, and the auxiliary battery 32.

The main battery 22 is a secondary battery such as a lithium ion battery or a nickel hydrogen battery. An output voltage V1 of the main battery 22 is higher than an output voltage V2 of the auxiliary battery 32.

The PCU 24 is electrically connected to the main battery 22 and the motor generators 28a, 28b, and 30a. The PCU 24 converts electric power of the main battery 22 into electric power for driving the motor generators 28a, 28b, and 30a. The PCU 24 includes a converter 24a and first to third inverters 24b, 24c, and 24d.

The converter 24a boosts direct current (DC) electric power to be supplied from the main battery 22, and supplies the boosted DC electric power to the first to third inverters 24b, 24c, and 24d. The converter 24a also lowers the DC electric power to be supplied from the first to third inverters 24b, 24c, and 24d, and supplies the lowered DC electric power to the main battery 22.

The first to third inverters 24b, 24c, and 24d convert the DC electric power that is supplied from the main battery 22 and boosted by the converter 24a into three-phase alternating current (AC) electric power, and the converted AC electric power is supplied to the first and second motor generators 28a and 28b and the rear motor generator 30a. The first to third inverters 24b, 24c, and 24d also convert the AC electric power to be supplied from the first and second motor generators 28a and 28b and the rear motor generator 30a into the DC electric power, and supply the converted DC electric power to the converter 24a.

Each of the first and second motor generators 28a and 28b and the rear motor generator 30a is composed of a three-phase synchronous motor. The first motor generator 28a is electrically connected to the first inverter 24b. The first motor generator 28a can start the engine 26. The first motor generator 28a can generate electricity when the output of the engine 26 is transmitted. Therefore, electric power generated by the first motor generator 28a can be charged to the main battery 22 via the PCU 24.

The second motor generator 28b is electrically connected to the second inverter 24c. Similarly to the engine 26, the second motor generator 28b is capable of transmitting power to front wheels (driving wheels) 34 of the vehicle. The second motor generator 28b can generate electricity by being driven by rotational force of the front wheels 34 during regenerative braking of the vehicle 20. Regenerative electric power generated by the second motor generator 28b can be charged to the main battery 22 via the PCU 24.

The rear motor generator 30a is electrically connected to the third inverter 24d. The rear motor generator 30a is capable of transmitting power to rear wheels (driving wheels) 36 of the vehicle. The rear motor generator 30a can generate electricity by being driven by rotational force of the rear wheels 36 during regenerative braking of the vehicle 20. Regenerative electric power generated by the rear motor generator 30a can be charged to the main battery 22 via the PCU 24.

The PCU 24 further includes a direct-current direct-current (DC-DC) converter 24e. That is, the PCU 24 has a structure in which the first to third inverters 24b, 24c, and 24d, the converter 24a, and the DC-DC converter 24e are integrated.

The DC-DC converter 24e is provided between the auxiliary battery 32 and electric power paths L provided between the main battery 22 and the motor generators 28a, 28b, and 30a (more specifically, the electric power paths L provided between the main battery 22 and the converter 24a). The DC-DC converter 24e lowers a voltage (corresponding to an output voltage of the main battery 22) V1 in the electric power path L to an output voltage V2 of the auxiliary battery 32. The DC-DC converter 24e lowers, to the output voltage V2 of the auxiliary battery 32, the electric power output from the main battery 22 and the regenerative electric power output from the second motor generator 28b and the rear motor generator 30a and lowered to the output voltage V1 of the main battery 22 by the converter 24a, and supplies the lowered electric power and the lowered regenerative electric power to the auxiliary battery 32.

The auxiliary battery 32 is composed of, for example, a lead storage battery. The auxiliary battery 32 is charged by the electric power output from the main battery 22 and the electric power that is regenerative electric power and is lowered by the DC-DC converter 24e.

Next, the vehicle thermal management system 10 according to the embodiment will be described. The system 10 includes a high-voltage air conditioner 12 to which electric power is supplied from the main battery 22, a low-voltage air conditioner 14 to which electric power is supplied from the auxiliary battery 32, and a control device 16.

The high-voltage air conditioner 12 is equipment in which the DC electric power of the output voltage V1 of the main battery 22 is supplied for air-conditioning of a vehicle cabin. The high-voltage air conditioner 12 is connected to the electric power paths L between the main battery 22 and the motor generators 28a, 28b, and 30a (more specifically, between the main battery 22 and the converter 24a).

The high-voltage air conditioner 12 includes, for example, a coolant heating heater (electric heater) 12a and/or an electric compressor 12b provided in an air-conditioning heat pump circuit. The coolant heating heater (electric heater) 12a is provided in a coolant circuit including a heating element composed of the main battery 22 or the engine 26, and a heater core (not shown) that heats air-conditioning air by exchanging heat with the air-conditioning air, and a heater that heats a coolant flowing through the coolant circuit to heat the heating element and the heater core. The air-conditioning heat pump circuit is a circuit in which an air-conditioning refrigerant circulates, and the electric compressor 12b compresses and discharges the air-conditioning refrigerant.

The low-voltage air conditioner 14 is provided separately from the high-voltage air conditioner 12, and is an auxiliary air conditioner provided to further improve comfort of an occupant in the vehicle cabin as compared with a case in which only the high-voltage air conditioner 12 is provided. The low-voltage air conditioner 14 operates by being supplied with the DC electric power of the output voltage V2 of the auxiliary battery 32. The low-voltage air conditioner 14 includes, for example, at least one of a steering heater 14a, an electric fan 14b, a seat heater 14c, a seat cooler 14d, and a seat ventilation system 14e. The steering heater 14a is a device that heats a steering wheel (not shown). The electric fan 14b is a device that supplies cooling air to a condenser (heat exchanger) (not shown) provided in the air-conditioning heat pump circuit. The seat heater 14c is a device for heating a seat. The seat cooler 14d is a device for cooling the seat. The seat ventilation system 14e is a device that releases heat from the seat by operating a fan installed inside the seat to improve ventilation of the seat.

The control device 16 includes a travel control electronic control unit (ECU) 17 and an air conditioner ECU 18 that are connected to each other such that the travel control ECU 17 and the air conditioner ECU 18 can communicate with each other.

The travel control ECU 17 controls the main battery 22 and the PCU 24. The travel control ECU 17 controls to supply the regenerative electric power to the main battery 22 when the regenerative electric power is not surplus. On the other hand, when the regenerative electric power is surplus, the travel control ECU 17 controls to prevent the regenerative electric power from being supplied to the main battery 22 (regeneration prohibition control to the main battery 22) such that the main battery 22 is not overcharged.

The case where "the regenerative electric power is not surplus" means that the regenerative electric power is not surplus with respect to the electric power that can be charged to the main battery 22, and the regenerative electric power is less than the electric power that can be charged to the main battery 22. The case where "the regenerative electric power is surplus" means that the regenerative electric power is surplus with respect to the electric power that can be charged to the main battery 22, and the regenerative electric power is more than the electric power that can be charged to the main battery 22.

The travel control ECU 17 controls the DC-DC converter 24e. Specifically, when the regenerative electric power is not surplus, the output voltage of the DC-DC converter 24e remains V2, but when the regenerative electric power is surplus under the situation in which the high-voltage air conditioner 12 is operating, the travel control ECU 17 controls to set the output voltage of the DC-DC converter 24e to V2-High that is higher than V2. The voltage V2-High is lower than the voltage V1.

Further, when the regenerative electric power is surplus and the low-voltage air conditioner 14 is operating under the situation in which the high-voltage air conditioner 12 is operating, the travel control ECU 17 controls to preferentially supply surplus regenerative electric power to the auxiliary battery 32 via the DC-DC converter 24e of which a set voltage is increased from V2 to V2-High. As a result, the voltage of the auxiliary battery 32 is increased from V2 to V2-High, and the output of the low-voltage air conditioner 14 to which electric power is supplied from the auxiliary battery 32 is increased.

The air conditioner ECU 18 controls the high-voltage air conditioner 12 and the low-voltage air conditioner 14. The air conditioner ECU 18 determines whether the low-voltage air conditioner 14 is operating when the regenerative electric power is surplus under the situation in which the high-voltage air conditioner 12 is operating, and transmits a determination result to the travel control ECU 17.

When the regenerative electric power is supplied to the auxiliary battery 32 by the travel control ECU 17 via the DC-DC converter 24e of which the set voltage is increased from V2 to V2-High, the air conditioner ECU 18 also controls to change the output of the high-voltage air conditioner 12 according to the output (operating status) of the low-voltage air conditioner 14. Specifically, as shown in FIG. 3, the air conditioner ECU 18 controls to reduce the output of the high-voltage air conditioner 12 when the output of the low-voltage air conditioner 14 is increased as compared with a case where the output of the low-voltage air conditioner 14 is not increased.

FIG. 2 is a flowchart that shows a control routine of the control device 16. The control routine shown in FIG. 2 is executed when the regenerative electric power is generated under the situation in which the high-voltage air conditioner 12 is operating.

First, in step S1, it is determined whether there is surplus regenerative electric power (whether the travel control ECU 17 performs regeneration prohibition control to the main battery 22). When it is determined in step S1 that there is no surplus regenerative electric power, the process proceeds to step S5, and without increasing the voltage of the DC-DC converter 24e from V2 to V2-High (without increasing the voltages of the DC-DC converter 24e and the auxiliary battery 32), the process proceeds to the end step.

On the other hand, when it is determined in step S1 that there is surplus regenerative electric power, the process proceeds to step S2, the set voltage of the DC-DC converter 24e is increased from V2 to V2-High by the travel control ECU 17, and the process proceeds to step S3.

In step S3, the air conditioner ECU 18 determines whether the low-voltage air conditioner 14 is operating. When the air conditioner ECU 18 determines in step S3 that the low-voltage air conditioner 14 is not operating, the process proceeds to step S5. Then, the air conditioner ECU 18 returns the voltage of the DC-DC converter 24e from V2-High to V2, and without increasing the voltages of the DC-DC converter 24e and the auxiliary battery 32, the process proceeds to the end step.

On the other hand, when the air conditioner ECU 18 determines in step S3 that the low-voltage air conditioner 14 is operating, the process proceeds to step S4. Then, in step S4, (i) the travel control ECU 17 preferentially supplies the surplus regenerative electric power to the auxiliary battery 32 via the DC-DC converter 24e of which the voltage is increased, so that the voltage of the auxiliary battery 32 is increased from V2 to V2-High to increase the output of the low-voltage air conditioner 14, and (ii) the air conditioner ECU 18 controls to suppress the output of the high-voltage air conditioner 12 according to the output of the low-voltage air conditioner 14. Then, the process proceeds to the end step.

Next, operations and effects of the examples of the present disclosure will be described.

(A) Since the control device 16 supplies the regenerative electric power to increase the output of the low-voltage air conditioner 14 when the regenerative electric power is surplus with respect to the electric power that can be charged to the main battery 22 as compared with a case where the regenerative electric power is not surplus with respect to the electric power that can be charged to the main battery 22, the output of the high-voltage air conditioner that is required to maintain comfort of an occupant in the vehicle cabin (work load and electric power per unit time) can be reduced. Therefore, it is possible to improve electric power consumption rate while maintaining comfort of an occupant in a vehicle cabin.

(B) Since the control device 16 changes the output of the high-voltage air conditioner 12 according to the output of the low-voltage air conditioner 14, the output of the high-voltage air conditioner 12 can be reduced when the output of the low-voltage air conditioner 14 is increased as compared with a case where the output of the low-voltage air conditioner 14 is not increased. Therefore, it is possible to improve electric power consumption rate while maintaining comfort of an occupant in a vehicle cabin.

(C) Since the control device 16 increases the voltage of the DC-DC converter 24e to increase the voltage of the auxiliary battery 32 and to increase the output of the low-voltage air conditioner 14, the output of the low-voltage air conditioner 14 can be comparatively easily increased.

In the embodiment, the case where the output of the low-voltage air conditioner 14 is increased when the low-voltage air conditioner 14 is operating under the situation in which the high-voltage air conditioner 12 is operating has been described. However, when the high-voltage air conditioner 12 is operating and the low-voltage air conditioner 14 is not operating, the low-voltage air conditioner 14 may be forcibly (automatically) operated to increase the output of the low-voltage air conditioner 14 by the surplus regenerative electric power.

What is claimed is:

1. A vehicle thermal management system comprising:
   a high-voltage air conditioner to which electric power is supplied from a main battery;
   a low-voltage air conditioner to which electric power is supplied from an auxiliary battery of which an output voltage is lower than an output voltage of the main battery; and
   a control device that includes a travel control electronic control unit and an air conditioner electronic control unit that are connected to each other such that the travel control electronic control unit and the air conditioner electronic control unit are able to communicate with each other, and supplies regenerative electric power to increase an output of the low-voltage air conditioner when the regenerative electric power is surplus with respect to electric power that is able to be charged to the main battery as compared with a case where the regenerative electric power is not surplus with respect to the electric power that is able to be charged to the main battery.

2. The vehicle thermal management system according to claim 1, wherein the control device changes an output of the high-voltage air conditioner according to the output of the low-voltage air conditioner.

3. The vehicle thermal management system according to claim 2, wherein the control device reduces the output of the high-voltage air conditioner when the output of the low-voltage air conditioner is increased as compared with a case where the output of the low-voltage air conditioner is not increased.

4. The vehicle thermal management system according to claim 1, wherein:
   the main battery is able to exchange electric power with a motor generator;
   a direct-current direct-current converter that lowers a voltage in an electric power path is provided between the auxiliary battery and the electric power path provided between the main battery and the motor generator; and
   the control device increases the output of the low-voltage air conditioner by increasing a voltage of the direct-current direct-current converter and increasing a voltage of the auxiliary battery when the regenerative electric power is surplus as compared with a case where the regenerative electric power is not surplus with respect to the electric power that is able to be charged to the main battery.

* * * * *